(12) United States Patent
Vicente Vicente et al.

(10) Patent No.: US 9,975,364 B2
(45) Date of Patent: May 22, 2018

(54) DETERMINING DEFORMATIONS OF SLICES OF AN IMAGE

(71) Applicant: HEWLETT-PACKARD DEVELOPMENT COMPANY, L.P., Houston, TX (US)

(72) Inventors: Secundino Vicente Vicente, Sant Cugat del Valles (ES); Xavier Domingo Reguant, Sant Cugat del Valles (ES); Li Qian, Sant Cugat del Valles (ES); Annarosa Multari, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days. days.

(21) Appl. No.: 15/208,201

(22) Filed: Jul. 12, 2016

(65) Prior Publication Data

US 2018/0015754 A1    Jan. 18, 2018

(51) Int. Cl.
*B41J 29/393*  (2006.01)
*B41J 3/60*    (2006.01)
*B41J 11/00*   (2006.01)

(52) U.S. Cl.
CPC ............... *B41J 29/393* (2013.01); *B41J 3/60* (2013.01); *B41J 11/008* (2013.01)

(58) Field of Classification Search
CPC . H04N 2201/04717; H04N 2201/04793; B41J 2/2135; G06K 15/027
See application file for complete search history.

(56) References Cited

U.S. PATENT DOCUMENTS

| 7,139,522 | B2 | 11/2006 | Ohki et al. | |
| 7,277,669 | B2* | 10/2007 | Howe | B65H 9/106 271/227 |
| 7,686,414 | B2 | 3/2010 | Korem et al. | |
| 7,758,146 | B2* | 7/2010 | Mizes | G06K 15/02 347/19 |
| 7,780,893 | B2* | 8/2010 | Sreenivasan | B29C 43/003 264/293 |
| 8,182,161 | B2 | 5/2012 | Rawlings et al. | |
| 2003/0041753 | A1* | 3/2003 | Regner | B41F 15/0813 101/129 |
| 2005/0271955 | A1* | 12/2005 | Cherala | B82Y 10/00 430/22 |

(Continued)

OTHER PUBLICATIONS

First Screen Truepress Jet W3200UV HS, (Web Page), The Journal for the Visual Communication Industries, Practical Sign + Digital Graphics, Nov. 2015, Issue 80 (80 pages).

(Continued)

*Primary Examiner* — Stephen Meier
*Assistant Examiner* — John P Zimmermann
(74) *Attorney, Agent, or Firm* — Trop, Pruner & Hu, P.C.

(57) ABSTRACT

In some examples, a method of controlling printing to a print medium includes, while printing an image to a print surface of the print medium, determining deformations of slices of the image caused by deformation of the print medium. The determining includes reading first fiducial marks printed on the print medium, determining a first deformation of a first slice of the slices based on the first fiducial marks, reading second fiducial marks printed on the print medium, and determining a second deformation of a second slice of the slices based on the second fiducial marks.

16 Claims, 6 Drawing Sheets

(56) References Cited

U.S. PATENT DOCUMENTS

| | | | |
|---|---|---|---|
| 2005/0286922 A1* | 12/2005 | Oki | H04N 1/0058 399/75 |
| 2008/0019727 A1* | 1/2008 | Honma | B41J 3/60 399/82 |
| 2011/0316925 A1* | 12/2011 | Saita | B41J 2/2142 347/19 |
| 2012/0081426 A1* | 4/2012 | Rossell | B41J 3/60 347/9 |
| 2013/0293613 A1 | 11/2013 | Berel | |
| 2015/0116734 A1 | 4/2015 | Howard et al. | |
| 2015/0298153 A1* | 10/2015 | Baker | B05B 12/12 438/7 |

OTHER PUBLICATIONS hp.com/go/Latex1500—HP Latex 1500 Printer, May 2016 (4 pages).

hp.com/go/Latex3100—HP Latex 3100 Printer, May 2016 (4 pages).

hp.com/go/Latex3500—HP Latex 3500 Printer, May 2016 (4 pages).

http://opencv.org/—OpenCV (open source computer vision) downloaded Jun. 9, 2016 (3 pages).

www.imagemagick.org/script/index.php—ImageMagick: Convert, Edit, or Compose Bitmap Images downloaded Jun. 9, 2016 (3 pages).

www.imagemagick.org/Usage/distorts/#shepards—ImageMagick v6 Examples—Distorting Images, Mar. 2012 (71 pages).

\* cited by examiner

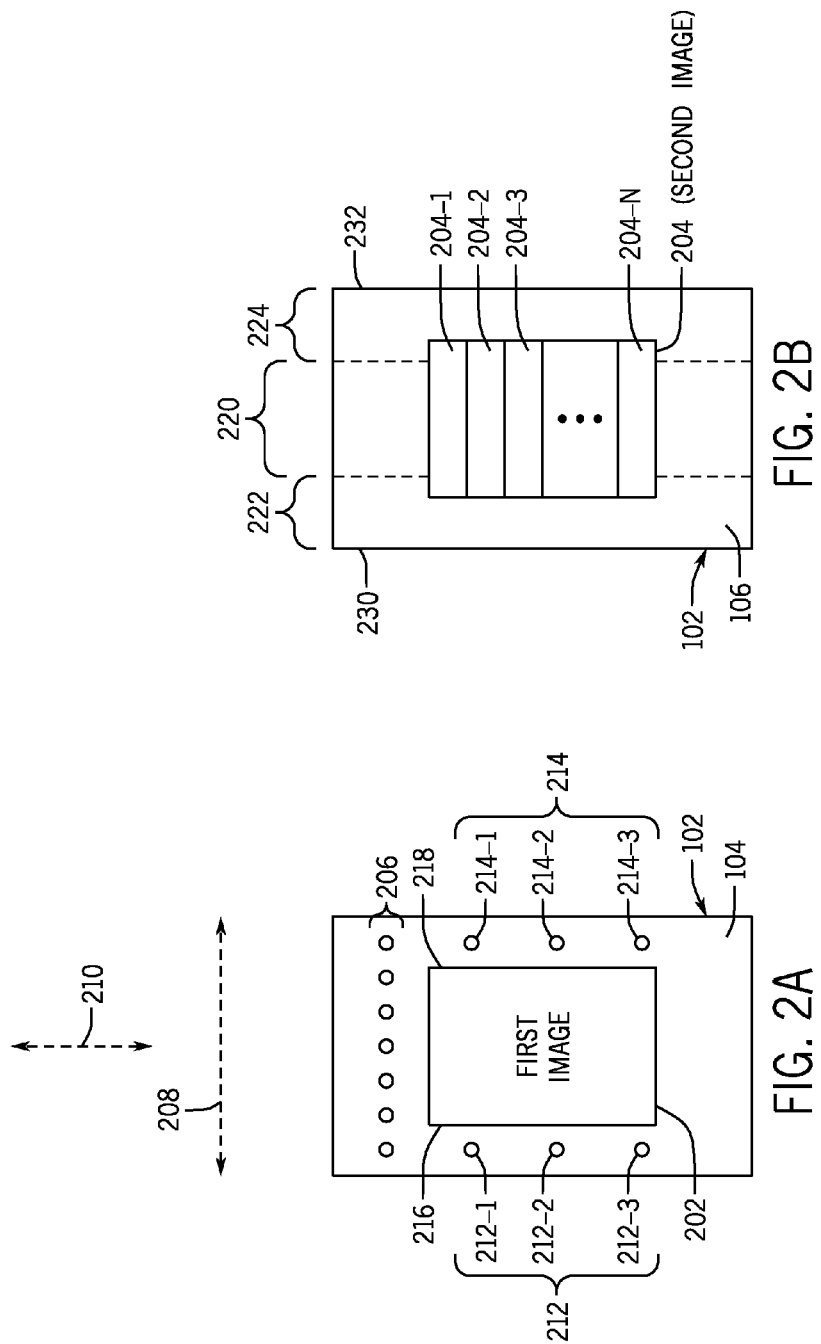

DETERMINING DEFORMATIONS OF SLICES OF AN IMAGE

BACKGROUND

A printing system can be used to print an image (including graphics and/or text) on a print medium. Generally, the print medium can be moved through a print zone of the printing system, where a printhead assembly can be used to deliver a printing fluid to the print medium to form an image on the print medium. Some printing systems can perform dual-sided printing, where images can be printed on both print surfaces of a print medium.

BRIEF DESCRIPTION OF THE DRAWINGS

Some implementations of the present disclosure are described with respect to the following figures.

FIG. 2A is a block diagram of a print medium with an example arrangement of fiducial marks and a first image printed on a first print surface of the print medium, according to some examples.

FIG. 2B is a block diagram of the print medium with a second image printed on a second print surface of the print medium, where deformations of slices of the second image are to be determined according to some examples.

DETAILED DESCRIPTION

Figure 1:
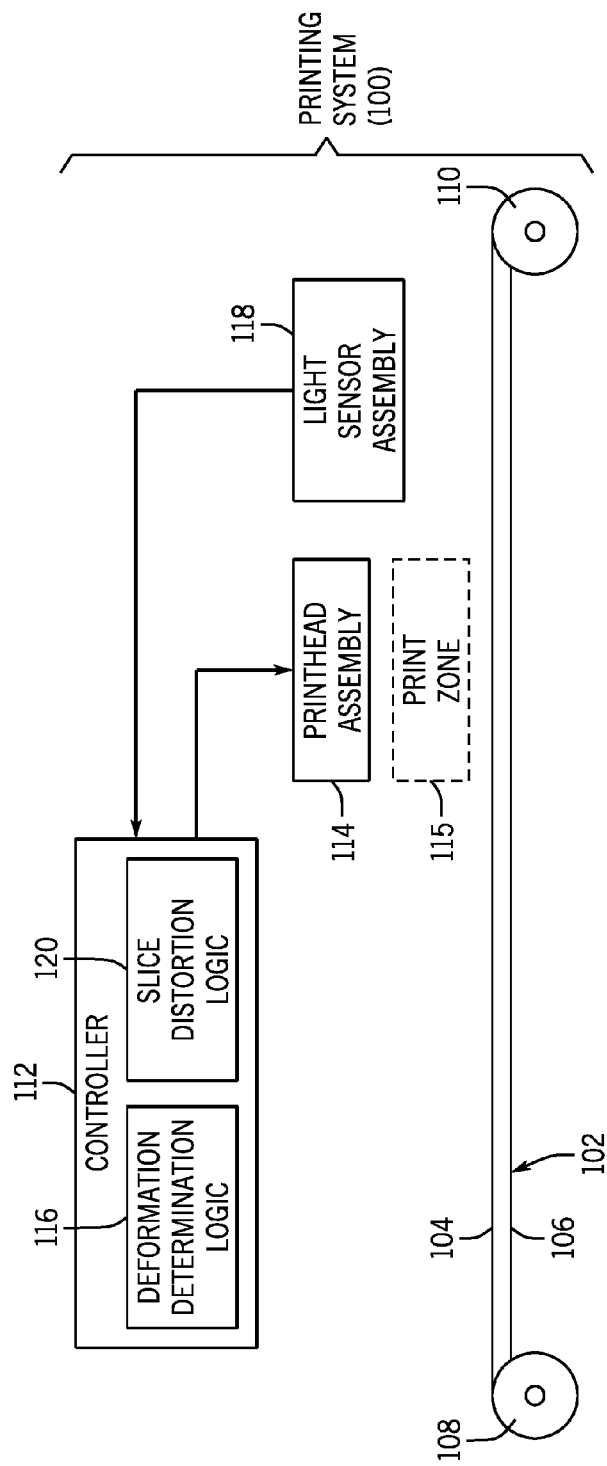
FIG. 1 is a block diagram of a printing system according to some examples.

Dual-sided printing can be applied in the context of "night and day" printing, where the same image (or similar images) can be printed on two opposite print surfaces of a print medium. A print medium can be formed of any of various different materials, such as paper, plastic, and so forth. With dual-sided printing, an image can be printed on a first print surface of the print medium, and a copy of the image (referred to as an "image copy") can be printed on the second print surface of the print medium. The image and the image copy on the different print surfaces can be aligned with respect to each other. The image copy printed on the second print surface can be an identical copy of the image printed on the first print surface, or substantially an identical copy (with minor differences such as added or modified text or graphical elements).

With dual-sided printing, the print medium can be translucent. A translucent print medium can refer to a print medium that allows at least some light to pass through the print medium. Note that a translucent print medium can also refer to a transparent print medium.

An example use case of night and day printing involves printing a billboard. Different light sources can be used to illuminate an image on the billboard at different times. For example, during the day, sunlight can be used to illuminate the image on the front surface of the print medium. However, at night, a backlight source is used to illuminate the image from the rear surface of the billboard. To increase the perceived quality of the image on the billboard when using the backlight source, a copy of the image on the front surface of the billboard is also printed on the rear surface of the billboard.

Although the foregoing refers to night and day printing as example use cases of dual-sided printing, it is noted that dual-sided printing can be applied in other contexts in other examples. In further examples, techniques or mechanisms according to some implementations can be applied in the context of single-sided printing, where printing occurs with respect to just one print surface of a print medium.

In some examples, a printing system that can perform dual-sided printing can be a large format (or wide format) printing system that is capable of printing on a print medium having a relatively large width (e.g., a width of 18 inches or more). In a large format printing system, a roll of the print medium can be unrolled and fed through a print zone of the printing system during printing. The print medium in the large format printing system can be subjected to relatively high tension during printing, which can cause deformation of the print medium.

Some print systems can also apply heat during printing. For example, a latex ink printing system prints latex inks that are water based. In other examples, printing systems can use other types of printing fluids. During printing using a latex ink, a heater can be used to generate a high temperature to cure the latex ink so that the latex ink can be bonded to the print medium. The use of heat in the printing process can cause the print medium to experience large variations in temperature, which can also cause deformation of the print medium.

A print medium is deformed if any portion of the print medium is changed in shape or is shifted from an expected location due to application of a force, such as due to tension or temperature variation. Deformation of a print medium during dual-sided printing can result in misalignment between images printed on the opposite print surfaces of the print medium. Such misalignment between the images printed on the different print surfaces of the print medium can cause a visible lack of registration between the images on the different print surfaces through the translucent print medium.

In accordance with some implementations of the present disclosure, to achieve alignment between a first image printed on a first print surface of a print medium and a second image printed on a second print surface of the print medium, continual dynamic distortion can be applied to slices of the second image while printing the second image on the second print surface (after the corresponding first image has been printed on the first print surface of the print medium). The continual dynamic distortion is applied in an online or real-time manner as the second image is being printed. In such examples, rather than distort the entire second image, slices of the second image are distorted as the image slices are being printed.

A "slice" of an image can refer to a partial fragment that is less than an entirety of the image. For example, multiple slices of an image can correspond to multiple rows or columns of the image. In other examples, different slices of the image can refer to other types of fragments of the image. Different slices of an image can have the same size and/or shape, or different slices can have different sizes and/or shapes.

In example implementations of the present disclosure, continual dynamic distortion can also be applied in the context of single-sided printing, where printing occurs on just one print surface of a print medium. As an example, a print job may involve printing different image parts onto the same print surface of a print medium. In a first pass of the print job, a first image may be printed on a print surface of the print medium. In a second pass of the print job, a second image may be printed on the same print surface of the print medium. Fiducial marks can be printed with the first image in the first pass, and these fiducial marks can be read in the second pass, or any later pass of the print job, to align the second image or a subsequent image with respect to the first image on the print surface.

In the ensuing discussion, reference is made to dual-side printing. However, it is noted that techniques or mechanisms of the present disclosure applicable to dual-side printing can also be applied to single-sided printing.

FIG. 1 is a schematic diagram of an example printing system 100 that can perform dual-sided printing on a print medium 102. The print medium 102 has a first print surface 104 and a second print surface 106. The print medium 102 can be mounted on rollers 108 and 110, which are used to transport the print medium 102 along a print direction. Although a simplified arrangement of rollers 108 and 110 are shown in FIG. 1, it is noted that the printing system 100 can include a more elaborate arrangement of rollers for feeding the print medium 102 through a print zone 115 of the printing system 100.

A controller 112 can be used to control a printhead assembly 114 including printheads to deliver a printing fluid (e.g., a latex ink or other type of ink, or other type of printing fluid) on the print medium 102. The controller 112 can include a hardware processing circuit or a combination of a hardware processing circuit and machine-readable instructions executable on the hardware processing circuit. Examples of a hardware processing circuit can include a microprocessor, a core of a multi-core microprocessor, a microcontroller, a field programmable array, a programmable integrated circuit, and so forth.

To perform dual-sided printing, the controller 112 can be used to control the printhead assembly 114 to first print an image (or multiple images) to the first print surface 104 of the print medium 102. Next, the print medium 102 can be flipped over, either manually or by an automated mechanism of the printing system 100. After the print medium 102 is flipped over, the controller 112 can be used control the printhead assembly 114 to print an image copy (or multiple image copies) to the second print surface 106, where the image copy (or image copies) are to be aligned with the image(s) printed on the first print surface 104. The printing system 100 further includes a light sensor assembly 118, which is discussed further below.

As shown in FIG. 2A, a first image 202 can be printed by the printhead assembly 114 on the first print surface 104 of the print medium 102. When printing the first image 202 on the first print surface 104, fiducial marks can also be printed by the printhead assembly 114 on the first print surface 104. A "fiducial mark" can refer to any indicia (such as in the form of a cross, a dot, a box, or any other type of indicator that can be printed on a print surface of the print medium). In some examples, the fiducial marks are placed on just the first print surface of the print medium, such that fiducial marks do not have to be printed on the second print surface.

The fiducial marks printed on the first printing surface 104 include first fiducial marks 206, which extend along a width of the print medium 102. The width of the print medium 102 extends along a width axis 208, which is generally perpendicular to a longitudinal axis 210 along which the print medium 102 is moveable during printing. The first fiducial marks 206 can be considered a row of fiducial marks that are printed adjacent a top side 220 (in the view of FIG. 2A) of the first image at 202.

The fiducial marks printed on the first print surface 104 further include second fiducial marks 212, 214. These second fiducial marks 212, 214 can be referred to as lateral fiducial marks that extend along the longitudinal axis 210 of the print medium 102. The lateral fiducial marks 212 (including 212-1, 212-2, and 212-3) are printed in a lateral margin adjacent a first lateral side of the first image 202, while the lateral fiducial marks 214 (including 214-1, 214-2, and 214-3) are printed in another lateral margin adjacent a second, opposite lateral side 218 of the first image 202. Although specific numbers of first and second fiducial marks 206, 212, and 214 are shown in FIG. 2A, it is noted that in other examples, different numbers of such fiducial marks can be printed on the first print surface 104.

Since the row of fiducial marks 206 can extend across the entire width of the print medium 102, there are a larger number of fiducial marks in the row 206 than there are lateral fiducial marks in the next row (e.g., the row of fiducial marks 212-1 and 214-1).

After the fiducial marks 206, 212, and 214 and the first image 202 have been printed on the first print surface 104, the print medium 102 is flipped over, either manually by a user or automatically by a flipping mechanism of the printing system 100. After the print medium 102 is flipped over, the printhead assembly 114 can be controlled by the controller 112 to print a second image 204 (FIG. 2B) on the second print surface 106 of the print medium 102, where the second image 204 printed on the second print surface 106 is an image copy of the first image 202, and is to be aligned with the first image 202 printed on the first print surface 104. The second image 204 is aligned with the first image 202 if an area occupied by the second image 204 on the second print surface 106 lines up with an area occupied by the first image 202, such that the second image 204 and the first image 202 are on top of each other when viewed from the top or bottom, i.e., the side edges (bottom, top, and lateral side edges) of one image do not extend past the corresponding side edges of the other image.

However, as explained above, due to deformations of the print medium 102 caused by tension and/or temperature variation, and/or other factors, misalignment between the images 202 and 204 on the first and second print surfaces 104 and 106 of the print medium 102 may occur.

In accordance with some implementations of the present disclosure, the controller 112 includes a deformation determination logic 116 (FIG. 1) that can determine deformations of slices 204-1, 204-2, 204-3, . . . , 204-N of the second image 204 to be printed on the second print surface 106, based on reading, by a light sensor assembly (including one light sensor or multiple light sensors) 118, the fiducial marks 206, 212, and 214 printed on the first print surface 104. A light sensor can detect light in a given field of view and can generated an output value based on the detected light. Generally, N is greater than one. The determined deformation of a slice can refer to a change in shape a shape, size, and/or any other dimensional attribute of the slice that is predicted to occur due to a deformation of a print medium. The determination of the deformations of the slices of the second image 204 printed on the second print surface is performed on a slice-by-slice basis, such that a first deformation is determined for a first slice, a second deformation is determined for a second slice, and so forth. This slice-by-slice determination of the different slices of the image allows for the correction of the deformations of the slices to be performed on an individual slice basis, in real-time as printing of the second image proceeds.

The deformation determination logic 116 can be implemented as a hardware processing circuit (such as with a portion of the hardware processing circuit of the controller 112), or alternatively, the deformation determination logic 116 can include machine-readable instructions executed on the controller 112.

The light sensor assembly 118 and the printhead assembly 114 can be mounted on a carriage (not shown) of the printing system 100, where the carriage is moveable relative to the print medium 102. The carriage can be incrementally advanced to print successive slices of an image on the print medium. When printing an image copy on the second print surface 106 of the print medium 102, as the carriage is advanced, the light sensor assembly 118 can be activated to read the next set of fiducial marks.

In the example arrangement of FIG. 1, when printing on the second print surface 106, the light sensor assembly 118 faces the second print surface 106. The print medium 102 can be a translucent print medium, such that the light sensor assembly 118 can capture the fiducial marks 206, 212, and 214 on the first print surface 104 through the translucent print medium 102. The captured images of the fiducial marks are transmitted by the light sensor assembly 118 to the controller 112. The deformation determination logic 116 can compare the positions of the captured fiducial marks to nominal positions of the fiducial marks, which are the expected positions of the fiducial marks assuming no deformation of the print medium 102 has occurred. Based on the comparison, the deformation determination logic 116 is able to determine the deformation of each slice of the multiple slices 204-1, 204-2, 204-3, . . . , 204-N of the second image 204.

Responsive to the determination performed by the deformation determination logic 116, a slice distortion logic 120 can distort a respective slice based on the determined deformation of the respective slice output by the deformation determination logic 116. The distortion of each slice is to correct for the determined deformation, such that when the slice is printed on the second print surface 106, the printed slice will be better aligned with the corresponding slice of the first image 202 printed on the first print surface 104. The controller 112 controls the printhead assembly 114 to print the distorted second image slice on the second print surface 106 of the print medium 102.

The slice distortion logic 120 can be implemented as a hardware processing circuit (such as with a portion of the hardware processing circuit of the controller 112), or alternatively, the deformation determination logic 116 can include machine-readable instructions executed on the controller 112.

In alternative implementations, the determination of deformations of slices of an image to be printed on a given print surface can be based on fiducial marks (similar to those discussed above) that are printed on the same given print surface. As noted above, the fiducial marks and a first image can be printed on the given print surface in a first pass of a print job. Then, when printing a second image on the same given print surface, the fiducial marks can be read and used to determine deformations of the slices of the second image using a process similar to that discussed above.

Figure 3A:
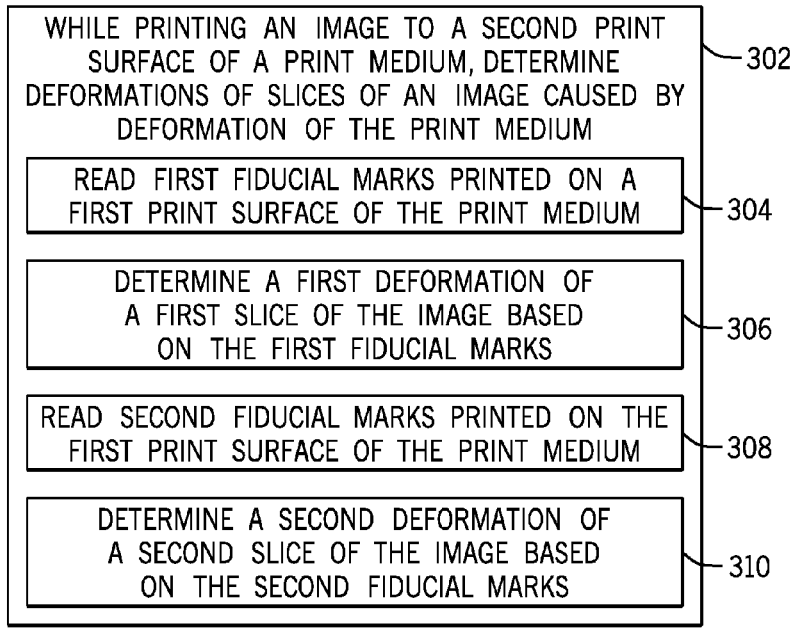
FIGS. 3A and 3B are flow diagrams of processes of determining deformations of slices of an image while printing, according to some examples.

FIG. 3A is a flow diagram of a process of controlling printing to a print medium, such as the print medium 102, according to some examples. The process of FIG. 3A can be performed by the controller 112 (or more specifically, by the deformation determination logic 116) or by another control component. While printing an image to the second print surface of the print medium, the process of FIG. 3A determines (at 302) deformations of slices of the image caused by deformation of the print medium. The determining of the deformations of the slices of the image includes reading (at 304) first fiducial marks (e.g., the fiducial marks 206 of FIG. 2A) printed on the first print surface of the print medium, and determining (at 306) a first deformation of a first slice of the slices based on the first fiducial marks. In addition, the determination of the deformation of slices of the image further includes reading (at 308) second fiducial marks (e.g., a pair of the lateral fiducial marks 212 and 214) printed on the first print surface of the print medium, and determining (at 310) a second deformation of a second slice of the slices based on the second fiducial marks. Note that the process of FIG. 3A can continue to determine deformations of additional slices of the image to be printed on the second print surface of the print medium, based on additional second fiducial marks printed on the first print surface.

After the first deformation of the first slice is determined, the slice distortion logic 120 can distort the first slice based on the determined first deformation, and the controller can cause the distorted first slice to be printed on the second print surface. Similarly, after the second deformation of the second slice is determined, the slice distortion logic 120 can distort the second slice based on the determined second deformation, and the controller can cause the distorted second slice to be printed on the second print surface.

Figure 3B:
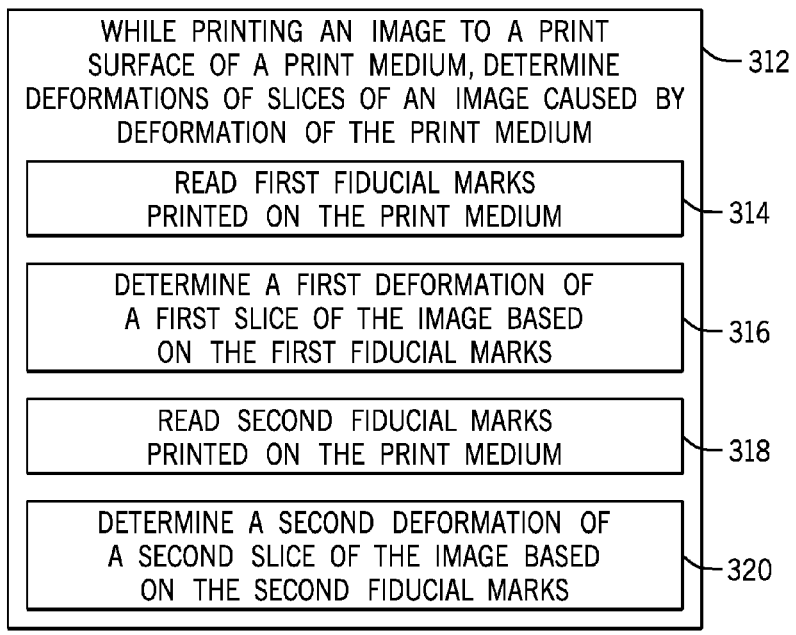

FIG. 3B is a flow diagram of a more general process of controlling printing to a print medium, according to further examples. The process of FIG. 3B can be performed by the controller 112 (or more specifically, by the deformation determination logic 116) or by another control component. The process of FIG. 3B can be in the context of single-sided printing or dual-sided printing.

While printing an image to a print surface of the print medium, the process of FIG. 3B determines (at 312) deformations of slices of the image caused by deformation of the print medium. The determining of the deformations of the slices of the image includes reading (at 314) first fiducial marks printed on the print medium, and determining (at 316) a first deformation of a first slice of the slices based on the first fiducial marks. In addition, the determination of the deformation of slices of the image further includes reading (at 318) second fiducial marks (e.g., a pair of the lateral fiducial marks) printed on the print medium, and determining (at 320) a second deformation of a second slice of the slices based on the second fiducial marks. Note that the process of FIG. 3B can continue to determine deformations of additional slices of the image to be printed on the print surface of the print medium, based on additional second fiducial marks printed on the print surface.

The following are examples of the types of deformation of a print medium that can occur in a printing system. A first type of deformation is a bow deformation, which is caused by greater tension applied along a central longitudinal region 220 (FIG. 2B) of a print medium and less tension applied on the lateral longitudinal portions 222 and 224 of the print medium. The central longitudinal region 220 and lateral longitudinal regions 222 and 224 extend in length along the longitudinal axis 210 (FIG. 2A). The difference in tensions applied to the central longitudinal region 220 and the lateral longitudinal regions 222 and 224 cause more stretching in the central longitudinal region 220 as compared to the lateral longitudinal regions 222 and 224, resulting in the bow deformation where the central longitudinal region 220 is deformed more than the lateral longitudinal regions 222 and 224.

A second type of deformation is a skew deformation (also referred to as a tilt deformation). A skew deformation occurs when one lateral side (e.g., 230 in FIG. 2B) of the print medium moves by a greater distance than another lateral side (e.g., 232 in FIG. 2B) of the print medium during printing. This causes a slight rotation of the print medium as the print medium is moved in the printing system during printing. Skew can continue to evolve (i.e., vary) as the print medium is unrolled from a row of the print medium and moved through the printing system.

A third type of deformation is a scale deformation, which is due to shrinkage of a print medium or expansion of the print medium due to temperature variation. Higher temperature can lead to expansion of the print medium, while a lower temperature can lead to shrinking of the print medium.

The different types of deformations can be determined using different fiducial marks printed on the first print surface of the print medium. For example, the row of fiducial marks 206 (FIG. 2A) that extends across the width of the print medium along the width access 208 can be used to determine multiple types of deformations, including, for example, the bow deformation, the skew deformation, and the scale deformation.

The different types of deformations that are determined from the row of fiducial marks 206 can be used to distort a first slice 204-1 of the second image 204, and this distorted first slice 204-1 of the second image 204 can be printed.

To process a second slice 204-2 of the second image 204, a first pair of lateral fiducial marks (212-1 and 214-1 in FIG. 2A), can be read. However, since the lateral fiducial marks 212-1 and 214-1 are located on the two lateral edge margins of the print medium, a bow deformation of the second slice 204-2 cannot be derived from just these lateral judicial marks 212-1 and 214-1. However, the bow deformation that was derived using the row of fiducial marks 206 can be used as the bow deformation for the second slice 204-2, as well as for the remaining slices of the second image 204.

In addition, the scale deformation for the second slice 204-2 can be determined by adjusting the scale deformation determined for the first slice 204-1 by an adjustment amount based on the lateral fiducial marks 212-1 and 214-1.

The next pair of lateral fiducial marks, 212-2 and 214-2, can be used to determine the skew and scale deformations of the next slice 204-3 of the second image 204. This process continues with successive pairs of the lateral fiducial marks until all remaining slices of the second image 204 have been processed.

Generally, the row of fiducial marks 206 are used to determine a first deformation of a first slice, where the first deformation includes multiple types of deformation components (e.g., bow deformation component, skew deformation component, and scale deformation component). Next, lateral fiducial marks 212-1 and 214-1 can be used to determine a second deformation of a second slice, where the second deformation includes: (1) the skew and scale deformation components determined based on the lateral fiducial marks 212-1 and 214-1, and (2) the bow deformation previously determined for the first slice. A similar procedure is used to determine a third deformation for a third slice.

Figure 4:
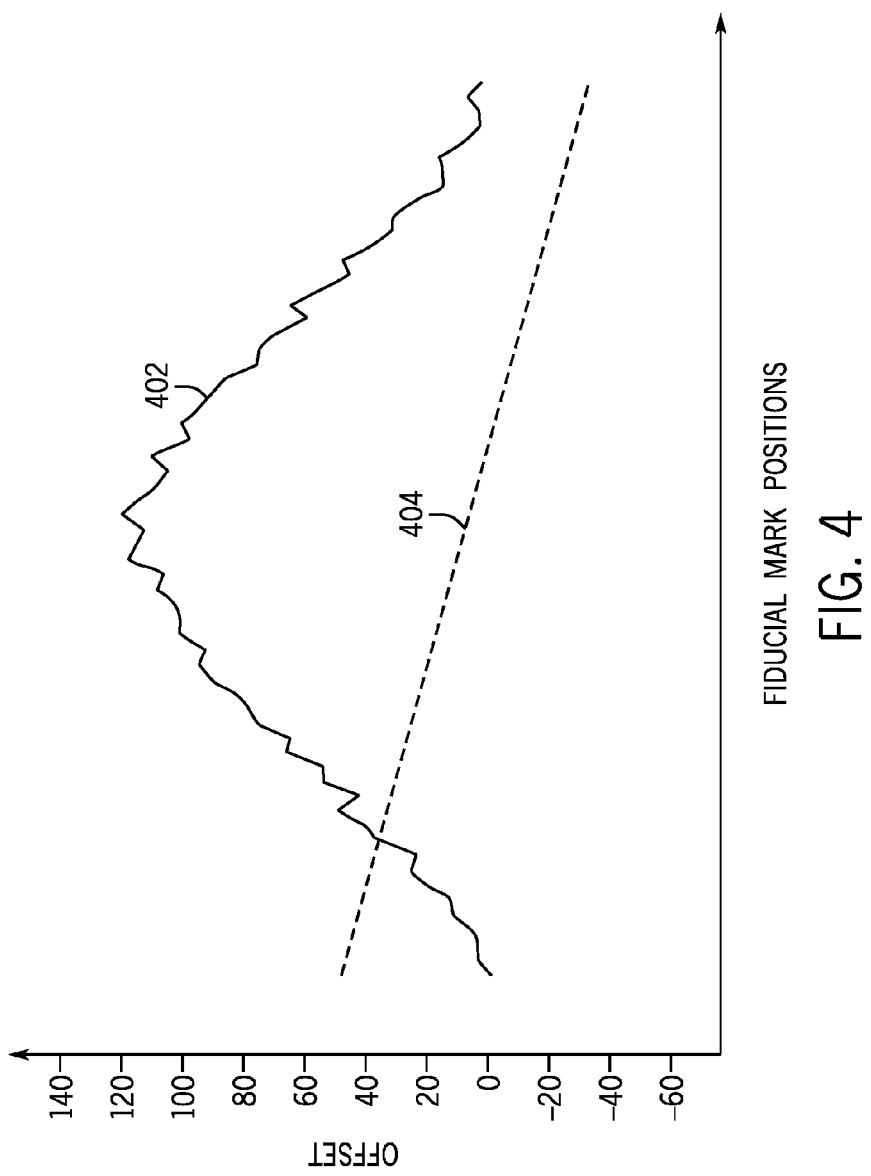
FIG. 4 is a graph of curves illustrating a bow deformation and a skew deformation, according to some examples.

FIG. 4 is a graph that illustrates how measurements derived from scanned fiducial marks (as captured by the light sensor assembly 118 of FIG. 1) can be used to determine a bow deformation (represented by curve 402 and a skew deformation (represented by curve 404). The horizontal axis of the graph of FIG. 4 corresponds to positions of fiducial marks printed on the first print surface of a print medium. The vertical axis of the graph of FIG. 4 represents offsets (distances) of the measured fiducial mark positions relative to respective nominal positions (which are the expected positions of the fiducial marks). FIG. 4 assumes that a row of fiducial marks (such as the row 206 in FIG. 2A) is available. As can be seen from the curve 402, the bow deformation includes larger offsets in the central longitudinal region of the print medium and smaller offsets on the lateral longitudinal regions of the print medium.

The skew deformation represented by the curve 404 is generally an angled line to indicate the rotation of the print medium relative to the print direction (along the axis 210 in FIG. 2A).

Figure 5:
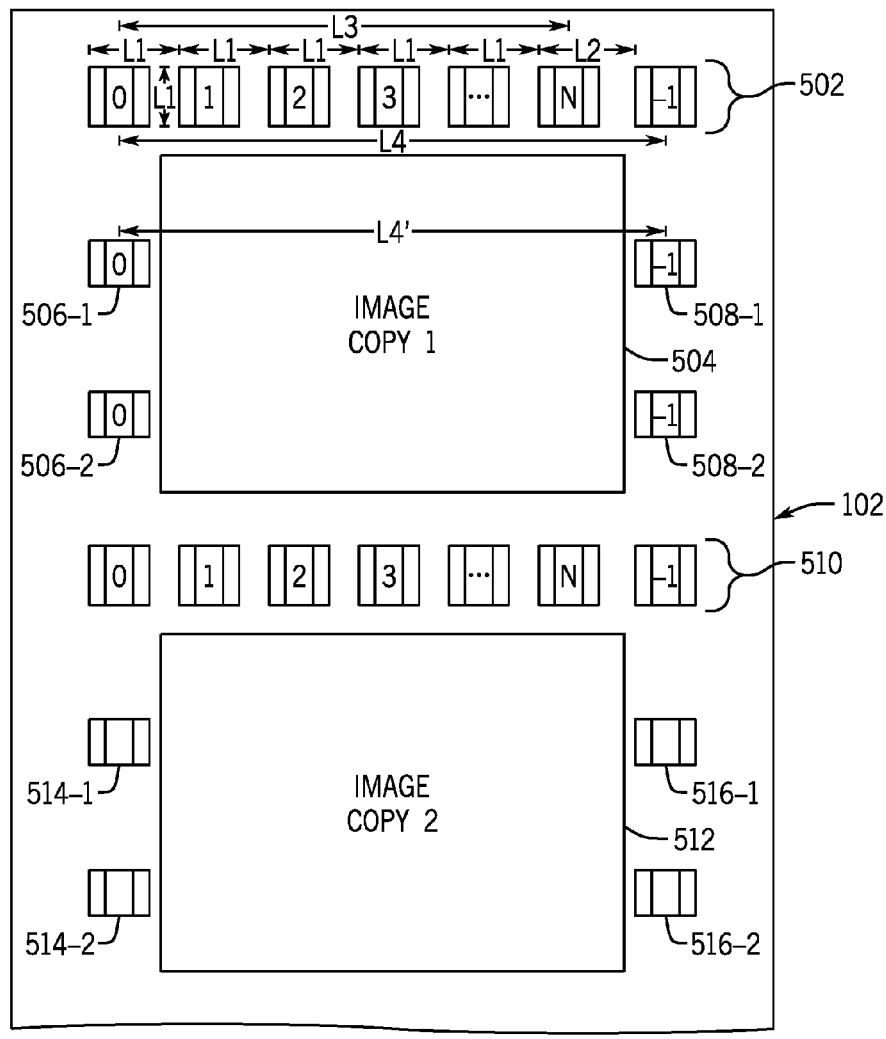
FIG. 5 is a block diagram illustrating positions of image copies on a print medium and corresponding fiducial marks, according to some examples.

FIG. 5 illustrates an example of how a scale deformation can be determined. In the example of FIG. 5, a first image copy 504 and a second image copy 512 are to be printed on the second print surface of the print medium 102. FIG. 5 also shows various fiducial marks, in the form of small boxes, that have been captured by the light sensor assembly 118 (FIG. 1). The fiducial marks are printed on the first print surface of the print medium 102.

The light sensor assembly 118 has captured an image of a first row of fiducial marks 502, which were printed on the first print surface of the print medium 102 adjacent a top edge of a first image on the first print surface that corresponds to the first image copy 504. Lateral fiducial marks 506-1 and 506-2 captured by the light sensor assembly 118 are located in a first lateral margin adjacent a first lateral side of the first image on the first print surface that corresponds to the first image copy 504. Lateral fiducial marks 508-1 and 508-2 captured by the light sensor assembly 118 are located in a second lateral margin adjacent a second lateral side of the first image on the first print surface that corresponds to the first image copy 504.

The light sensor assembly 118 has captured another row of fiducial marks 510, which were printed on the first print surface of the print medium 102 adjacent the top side of a second image printed on the first print surface that corresponds to the second image copy 512. Additional lateral fiducial marks 514-1, 514-2 and 516-1, 516-2 are located in respective lateral margins adjacent the two lateral sides of the second image printed on the first print surface that corresponds to the second image copy 512.

The scale deformation of a slice of an image copy (e.g., 504 or 512) can be represented by a parameter Scale_Factor. In FIG. 5, the spacing between successive fiducial marks of a subset of fiducial marks (fiducial marks 0, 1, . . . , N) in the row 502 is L1. More specifically, as depicted in FIG. 5, for fiducial marks 0, 1, . . . , N, the spacing between each successive pair of fiducial marks is L1. In the example of FIG. 5, the spacing between fiducial mark N and fiducial mark −1 (on the far right of the row 502) is L2, where L2 can be different from L1.

As further depicted in FIG. 5, the distance between the center of fiducial mark 0 and the center of fiducial mark N in the row 502 is L3. The nominal distance from the center of fiducial mark 0 to fiducial mark N is known, and is represented as N*L1. The parameter Scale_Factor (which represents the scale deformation) derived from the row of fiducial marks 502 can then be calculated as $$\text{Scale\_Factor} = L3/(N*L1).$$

The parameter Scale_Factor calculated based on the row of fiducial marks 502 represents an initial scale deformation, which can be used as the scale deformation for a first slice of the image copy 504.

To process the second slice of the image copy 504, the parameter Scale_Factor can be updated based on the pair of captured lateral fiducial marks 506-1 and 508-2. For example, for the second slice, the distance (L4') between lateral fiducial mark 506-1 and the lateral fiducial mark 508-1 is measured. Also, the distance (L4) between fiducial mark 0 and fiducial mark −1 in the row 502 is also measured. The parameter Scale_Factor can then be adjusted based on the measured distances L4 and L4' as follows:

Adjusted Scale_Factor=$(L3/(N*L1))*(L4/L4')$.

The adjusted Scale_Factor represents the scale deformation for the second slice.

The parameter Scale_Factor for subsequent slices can be computed in similar fashion.

Once the bow deformation, skew deformation, and scale deformation have been determined for each slice of an image copy to be printed on the second print surface of the print medium, the different types of deformations can be used by the slice distortion logic 120 to produce a distortion data structure, such as a distortion dot matrix. The distortion dot matrix includes information to move original dot positions (a "dot" can refer to a pixel or collection of pixels) of an original image to different dot positions based on the determined deformations. The distortion dot matrix can then be applied by the slice distortion logic 120 as an input to any of various image processing applications, such as the IMAGEMAGICK suite of image processing applications, the OPENCV library of image processing applications, and so forth. The image processing application(s) can produce a distorted image slice based on an original image slice (the image slice printed on the first print surface of the print medium) and the distortion dot matrix.

Since the slices of an image copy to be printed on the second print surface of a print medium are distorted on an individual slice basis, the concatenation of the slices of the image copy can be processed to ensure continuity of the image slices. For example, blurring of the edge portions of successive distorted slices can be applied, such as by using any of the image processing applications discussed above. This blurring is to reduce the likelihood of visible discontinuities between slices caused by the individual slice distortions.

Figure 6:
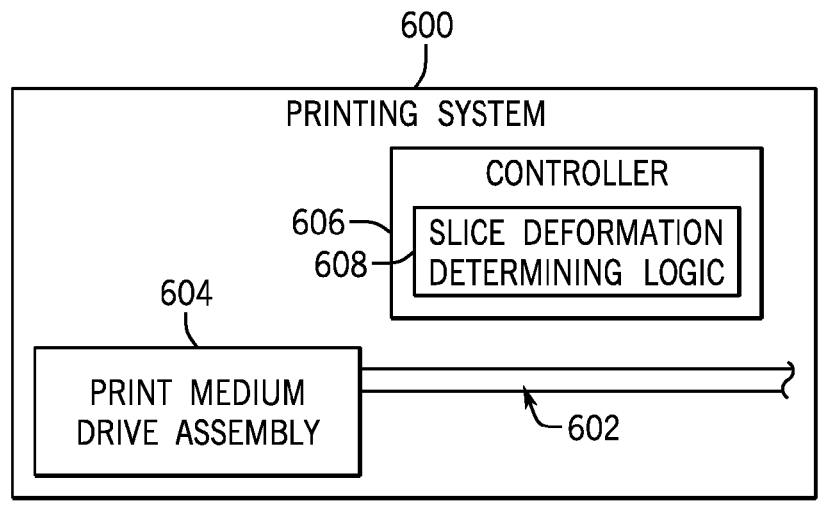
FIG. 6 is a simplified block diagram of a printing system according to further examples.

FIG. 6 is a simplified view of a printing system 600 according to further examples. The printing system 600 can perform single-sided printing or dual-sided printing of a print medium 602. The printing system 600 includes a print medium drive assembly 604 (which can include rollers, for example) to transport the print medium 602 through a print zone of the printing system 600. The printing system 600 further includes a controller 606 including slice deformation determination logic 608 to, while printing, to a print surface of the print medium 602, a second image that is to be aligned with a first image on the print medium 602, determine on a slice-by-slice basis deformations of slices of the second image relative to the first image. The determining of the deformations of the slices includes determining, based on an image of a row of fiducial marks on the print medium, a deformation of a first slice of the slices, the determined deformation of the first slice comprising a first deformation component and a second deformation component, and determining a deformation of a second slice of the slices, the determined deformation of the second slice including the first deformation component, and a deformation component determined based on an image of lateral fiducial marks on the print medium.

Figure 7:
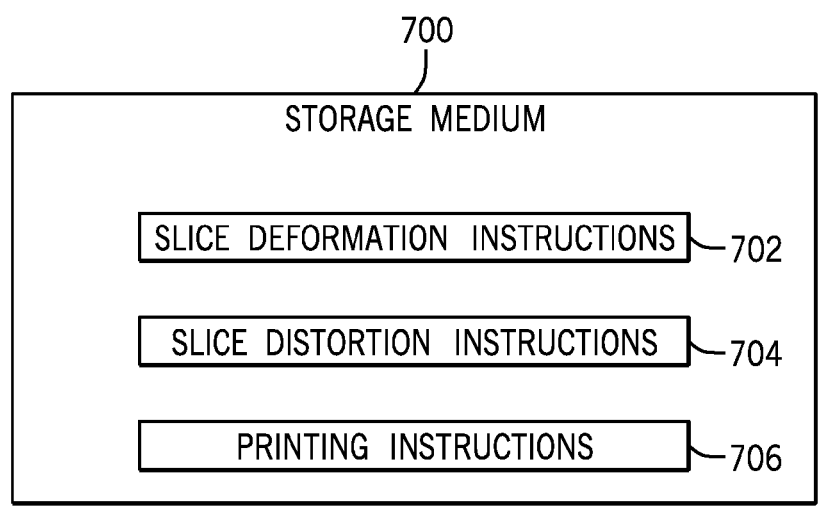
FIG. 7 is a block diagram of a storage medium storing machine-readable instructions according to some examples.

FIG. 7 is a block diagram of a non-transitory machine-readable or computer-readable storage medium storing machine-readable instructions that upon execution by a controller can cause the controller to perform various tasks. The machine-readable instructions include slice deformation instructions 702 to determine deformations of slices of an image to be printed on a print surface caused by deformation of a print medium. The machine-readable instructions further include slice distortion instructions 704 to distort the slices based on the determined deformations, and printing instructions 706 to cause printing of the distorted slices on the print surface of the print medium.

The storage medium 700 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of controlling printing to a print medium, the method comprising:
   while printing a first image to a print surface of the print medium on which a second image has been previously printed, aligning the first image to the second image by correcting for deformations of slices of the first image caused by deformation of the print medium, the aligning comprising:
      reading first fiducial marks printed on the print medium;
      determining a first deformation of a first slice of the slices based on the first fiducial marks;
      distorting the first slice based on the determined first deformation to align the first slice to a corresponding first slice of the second image;
      causing printing of the distorted first slice on the print surface;
      after causing the printing of the distorted first slice on the print surface:

reading second fiducial marks printed on the print medium;

determining a second deformation of a second slice of the slices based on the second fiducial marks;

distorting the second slice based on the determined second deformation to align the second slice to a corresponding second slice of the second image; and causing printing of the distorted second slice on the print surface.

2. The method of claim 1, wherein the first fiducial marks extend along a width of the print medium, and wherein a number of the first fiducial marks is greater than a number of the second fiducial marks.

3. The method of claim 2, wherein the first fiducial marks extend along a row across the print medium, and wherein determining the first deformation of the first slice comprises determining, based on the first fiducial marks, plural types of deformation components.

4. The method of claim 3, wherein a first of the second fiducial marks is arranged on a first side of the first image on the print medium, and a second of the second fiducial marks is arranged on a second side of the first image on the print medium, wherein determining the second deformation of the second slice comprises:

using one of the plural types of deformation components determined from the first fiducial marks, and determining, based on the second fiducial marks, deformation components for the second slice.

5. The method of claim 4, wherein the plural types of deformation components determined from the first fiducial marks comprise a bow deformation component, a skew deformation component, and a scale deformation component, and the deformation components determined based on the second fiducial marks comprise a skew deformation component and a scale deformation component.

6. The method of claim 2, further comprising:

while printing a third image on the print surface of the print medium:

determining deformations of slices of the third image caused by deformation of the print medium, the determining of the deformations of the slices of the third image based on reading third fiducial marks printed on the print medium and extending along a width of the print medium, and reading fourth fiducial marks printed on the print medium.

7. The method of claim 1, wherein the print surface on which the first image is to be printed is a first print surface of the print medium, and the first and second fiducial marks are printed on a second, opposite print surface of the print medium.

8. The method of claim 7, wherein determining the first and second deformations of the first and second slices is based on the first and second fiducial marks printed on the second print surface without use of any fiducial marks printed on the first print surface.

9. The method of claim 7, wherein the print medium is a translucent print medium, and wherein reading the first and second fiducial marks uses at least one light sensor to image the first and second fiducial marks through the translucent print medium.

10. A printing system to perform dual-sided printing of a print medium comprising a first print surface and a second print surface, the printing system comprising:

a print medium drive assembly to transport the print medium through a print zone of the printing system; and a controller to:

when printing, to the second print surface of the print medium, a second image, control alignment of the second image with a first image on the first print surface of the print medium, the controlling of the alignment comprising:

determining, based on an image of a row of fiducial marks on the first print surface, a first deformation of a first slice of slices of the second image, the determined first deformation of the first slice comprising a first deformation component and a second deformation component;

distorting the first slice of the second image based on the determined first deformation to align the first slice of the second image to a corresponding first slice of the first image;

causing printing of the distorted first slice of the second image on the second print surface;

after causing the printing of the distorted first slice of the second image on the second print surface:

determining a second deformation of a second slice of the slices of the second image, the determined second deformation of the second slice of the second image comprising the first deformation component, and a deformation component determined based on an image of lateral fiducial marks on the first print surface;

distorting the second slice of the second image based on the determined second deformation to align the second slice of the second image to a corresponding second slice of the first image; and causing printing of the distorted second slice of the second image on the second print surface.

11. The printing system of claim 10, wherein the controller is to:

cause printing, on the first print surface, of the row of fiducial marks adjacent a top side of the first image on the first print surface;

cause printing, on the first print surface, of the lateral fiducial marks along lateral margins of the first print surface adjacent different lateral sides of the first image.

12. A non-transitory machine-readable storage medium storing instructions that upon execution cause a controller to control printing to a print medium having a print surface, the instructions upon execution causing the controller to:

while printing a first image to the print surface of the print medium on which a second image has been previously printed, control alignment of the first image to the second image by correcting for deformations of slices of the first image due to deformation of the print medium, the controlling of the alignment comprising:

reading a row of fiducial marks printed on the print medium;

determining a first deformation of a first slice of the slices based on the row of fiducial marks;

distorting the first slice based on the determined first deformation to align the first slice to a corresponding first slice of the second image;

causing printing of the distorted first slice on the print surface;

after causing the printing of the distorted first slice on the print surface:

reading lateral fiducial marks printed on the print medium;

determining a second deformation of a second slice of the slices based on the lateral fiducial marks;

distorting the second slice based on the determined second deformation to align the second slice to a corresponding second slice of the second image;

cause printing of the distorted second slice on the print surface of the print medium.

13. The non-transitory machine-readable storage medium of claim 12, wherein the print surface is a first print surface of the print medium, and wherein the lateral fiducial marks are provided on two opposite lateral sides of an image printed on a second print surface of the print medium.

14. The non-transitory machine-readable storage medium of claim 12, wherein the print surface on which the first image is printed is a first print surface of the print medium, and wherein the second image was previously printed on a second print surface of the print medium.

15. The non-transitory machine-readable storage medium of claim 12, wherein determining the first deformation of the first slice based on the row of fiducial marks comprises determining a bow deformation component, a skew deformation component, and a scale deformation component.

16. The non-transitory machine-readable storage medium of claim 15, wherein determining the second deformation of the second slice based on the lateral fiducial marks comprises determining a bow deformation component and a skew deformation component.

* * * * *